(12) United States Patent
Imada

(10) Patent No.: US 11,098,189 B2
(45) Date of Patent: Aug. 24, 2021

(54) RESIN COMPOSITION AND RESIN MOLDED BODY

(71) Applicant: FUJIFILM Business Innovation Corp., Tokyo (JP)

(72) Inventor: Akira Imada, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 16/253,222

(22) Filed: Jan. 22, 2019

(65) Prior Publication Data

US 2020/0095417 A1 Mar. 26, 2020

(30) Foreign Application Priority Data

Sep. 26, 2018 (JP) .............................. JP2018-180856

(51) Int. Cl.
| | |
|---|---|
| *C08L 55/02* | (2006.01) |
| *C08L 67/02* | (2006.01) |
| *C08K 5/00* | (2006.01) |
| *C08K 3/04* | (2006.01) |
| *C08K 5/521* | (2006.01) |

(52) U.S. Cl.
CPC ............... *C08L 55/02* (2013.01); *C08K 3/04* (2013.01); *C08K 5/0066* (2013.01); *C08K 5/521* (2013.01); *C08L 67/02* (2013.01); *C08L 2201/02* (2013.01)

(58) Field of Classification Search
CPC ........... C08L 55/02; C08L 67/02; C08K 3/04; C08K 5/0066; C08K 5/521
See application file for complete search history.

(56) References Cited

U.S. PATENT DOCUMENTS

2011/0118371 A1* 5/2011 Staal ....................... C08L 51/04
521/139
2014/0323606 A1* 10/2014 Mueller .................. C08L 51/04
521/139

FOREIGN PATENT DOCUMENTS

| JP | 2001-049096 | * | 2/2001 | .............. C08L 67/02 |
| JP | 2002194052 | | 7/2002 | |
| JP | 2015042703 | | 3/2015 | |

OTHER PUBLICATIONS

English machine translation of JP 2001-049096 (Year: 2001).*

* cited by examiner

*Primary Examiner* — John E Uselding
(74) *Attorney, Agent, or Firm* — JCIPRNET

(57) ABSTRACT

A resin composition includes an acrylonitrile-butadiene-styrene resin (A), a polyethylene terephthalate resin (B), a condensed phosphoric acid ester-based flame retardant (C), and a thermally expandable graphite (D).

9 Claims, 1 Drawing Sheet

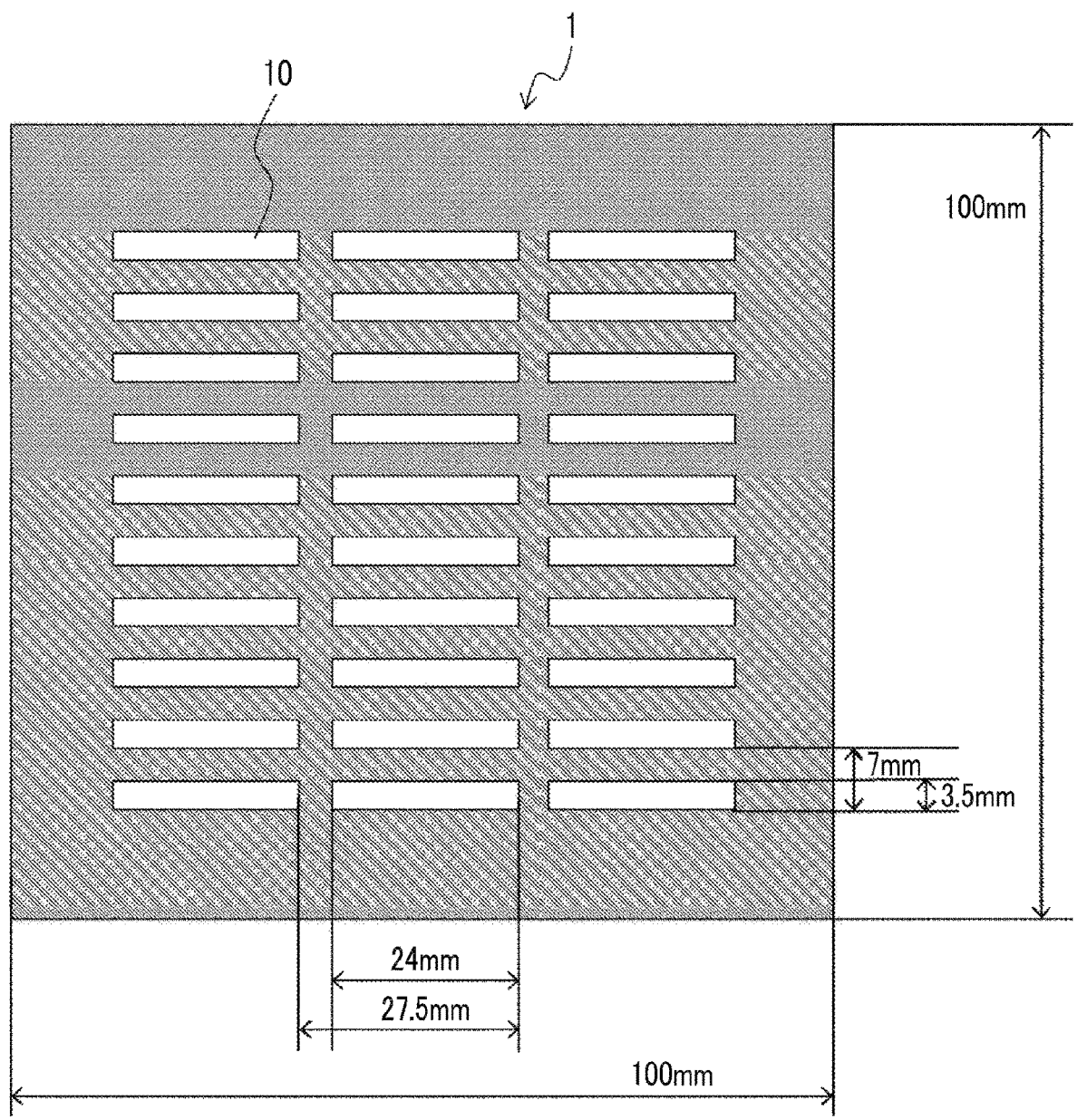

RESIN COMPOSITION AND RESIN MOLDED BODY

CROSS-REFERENCE TO RELATED APPLICATIONS

This application is based on and claims priority under 35 USC 119 from Japanese Patent Application No. 2018-180856 filed on Sep. 26, 2018.

BACKGROUND

(i) Technical Field

The present invention relates to a resin composition and a resin molded body.

(ii) Related Art

In the related art, various resin compositions have been provided and used for various applications. Resin compositions have been used for particularly house appliances, various components of automobiles, housings, and the like. Further, resin compositions have also been used for housing components such as office equipment and electric and electronic equipment.

For example, JP2002-194052A discloses a flame retardant resin composition obtained by blending 1 to 100 parts by weight of (B) styrene-based resin, 1 to 100 parts by weight of (C) phosphoric acid ester, and 1 to 150 parts by weight of (D) triazine-based compound and a salt of cyanuric acid or isocyanuric acid with respect to 100 parts by weight of (A) polyalkylene terephthalate resin in which the amount of a carboxyl terminal group is 40 eq/ton or less.

Further, JP2015-042703A discloses a flame retardant thermoplastic resin composition that contains 0.01 to 1 parts by weight of an acryl-styrene-based copolymer (III) containing an epoxy group and 8 to 16 parts by weight of a phosphoric acid ester-based flame retardant (IV) with respect to 100 parts by weight which is the total amount of a rubber-reinforced styrene-based resin (I) and a polyethylene terephthalate resin (II).

SUMMARY

Aspects of non-limiting embodiments of the present disclosure relate to a resin composition from which a resin molded body having high impact resistance and excellent flame retardance is obtained, compared to a case where the resin composition contains an acrylonitrile-butadiene-styrene resin and a polyethylene terephthalate resin and does not contain either of a condensed phosphoric acid ester-based flame retardant and a thermally expandable graphite.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a resin composition including: an acrylonitrile-butadiene-styrene resin (A); a polyethylene terephthalate resin (B); a condensed phosphoric acid ester-based flame retardant (C); and a thermally expandable graphite (D).

BRIEF DESCRIPTION OF THE DRAWING

Exemplary embodiment(s) of the present invention will be described in detail based on the following FIGURE, wherein:

The FIGURE is a plan view schematically illustrating a test piece used in a louver portion (opening portion) strength test.

DETAILED DESCRIPTION

Hereinafter, exemplary embodiments of the present invention will be described in detail.

These descriptions and the examples are made for exemplifying the present invention and are not used to limit the scope of the invention.

Further, the mechanisms described in the present specification includes estimation, and the correctness thereof does not limit the scope of the invention.

In a case where an amount of each component in a composition is mentioned in the present specification and a plurality of materials corresponding to each component in the composition are present, this amount indicates the total amount of the plurality of materials present in the composition unless otherwise specified.

Resin Composition

A resin composition according to the present exemplary embodiment contains an acrylonitrile-butadiene-styrene resin (A), a polyethylene terephthalate resin (B), a condensed phosphoric acid ester-based flame retardant (C), and a thermally expandable graphite (D).

In the description of the present specification, the acrylonitrile-butadiene-styrene resin is also referred to as an "ABS resin", the polyethylene terephthalate resin is also referred to as a "PET resin", and the condensed phosphoric acid ester-based flame retardant is also referred to as a "specific flame retardant".

A resin composition containing an ABS resin and a PET resin is known as a resin composition from which a resin molded body having excellent impact resistance is obtained. At the time of imparting flame retardance to this resin molded body, a method of using a flame retardant such as a condensed phosphoric acid ester-based flame retardant (specific flame retardant) for the resin composition containing an ABS resin and a PET resin may be employed.

However, the impact resistance of the resin molded body to be obtained from the resin composition containing an ABS resin, a PET resin, and a specific flame retardant is degraded compared to a case where the resin composition does not contain a specific flame retardant, and thus the flame retardance does not reach the target level (specifically, the V-2 criteria in UL 94 standards) in some cases.

Meanwhile, the resin composition according to the present exemplary embodiment contains an ABS resin, a PET resin, a specific flame retardant, and a thermally expandable graphite.

With this configuration, a resin molded body having high impact resistance and excellent flame retardance may be obtained.

The reason for this is not clear, but can be assumed as follows.

The "thermally expandable graphite" is a granular material that expands at the time of being heated.

In a case where this thermally expandable graphite is used together with a specific flame retardant, the thermally expandable graphite which is a granular material functions as a filler, degradation of the impact resistance is suppressed.

Meanwhile, in a case where a resin molded body containing a thermally expandable graphite is heated, burning drippings are likely to be generated due to expansion of the thermally expandable graphite. Therefore, in the resin molded body obtained from the resin composition according to the present exemplary embodiment, it is considered that, since a part of a test piece drops as burning drippings so that the test piece is not entirely burned at the time of the evaluation of the flame retardance in the V test of the UL 94 standards, the flame retardance satisfying the "V-2 criteria in the UL 94 standards" is likely to be achieved.

Hereinafter, each component in the resin composition according to the present exemplary embodiment will be described in detail.

Resin

ABS Resin (A)

The ABS resin is not particularly limited, and a resin in which the ratio of components (acrylonitrile:butadiene:styrene) is a mass ratio and is in a range of 20:5:40 to 30:40:70 is exemplified.

Further, the ABS resin may be produced not only by causing copolymerization but also by employing a polymer blend method.

The weight-average molecular weight of the ABS resin is not particularly limited. For example, it is preferable that the weight-average molecular weight thereof is in a range of 1000 to 100000 and desirably in a range of 5000 to 50000.

In a case where the weight-average molecular weight of the ABS resin is extremely small, the fluidity becomes excessive and this may result in degradation of the processability. Further, in a case where the weight-average molecular weight of the ABS resin is extremely large, the fluidity becomes insufficient and this may result in degradation of the processability.

Here, the weight-average molecular weight of the "ABS resin" in the present specification is measured by gel permeation chromatography (GPC). The measurement of the molecular weight through GPC is performed using a chloroform solvent, HLC-8320GPC (TOSOH CORPORATION) as a measuring device, and TSK gel GMHHR-M and TSKgel GMHHR-M (7.8 mmI. D. 30 cm) (TOSOH CORPORATION) as columns. The weight-average molecular weight is calculated using a molecular weight calibration curve which is prepared by a monodisperse polystyrene standard sample based on the measurement results.

The ABS resin may be used alone or in combination of two or more kinds thereof.

From the viewpoint of obtaining a resin molded body with excellent impact resistance, the content of the ABS resin in the resin composition is, for example, preferably 50% by mass or greater, more preferably 60% by mass or greater, and still more preferably 65% by mass or greater with respect to the total amount of the ABS resin and the PET resin.

The upper limit of the content of the ABS resin in the resin composition is, for example, preferably 90% by mass and more preferably 75% by mass.

PET Resin (B)

The PET resin is not particularly limited as long as the PET resin is a condensation polymer that is formed of ethylene glycol and terephthalic acid and has an ester bond in the main chain.

Further, the PET resin may be a condensation polymer obtained by using 20% by mole or less of diol components, for example, long chain glycols such as propylene glycol, 1,4-butanediol, neopentyl glycol, 1,5-pentanediol, 1,6-hexanediol, decamethylene glycol, cyclohexanedimethanol, cyclohexanediol, polyethylene glycol having a molecular weight of 400 to 6000, poly-1,3-propylene glycol, or polytetramethylene glycol together with ethylene glycol in 100% by mole of all diol components.

In addition, the PET resin may be a condensation polymer obtained by using, 20% by mole or less of acid components such as isophthalic acid, adipic acid, or oxalic acid together with terephthalic acid in 100% by mole of all acid components.

Further, the PET resin may be a virgin material (hereinafter, also referred to as a "virgin PET resin") which has not undergone a thermal history such as molding processing or may be a recovered resin (hereinafter, also referred to as a "recovered PET resin") which has been recovered from a molded article of a PET resin.

The molded article from which the recovered PET resin is derived is not particularly limited, and all of a resin derived from a PET resin fiber, a resin derived from a PET resin bottle, a resin derived from a PET resin film, and the like are used.

The weight-average molecular weight of the PET resin is not particularly limited. For example, it is preferable that the weight-average molecular weight thereof is in a range of 5000 to 100000 and desirably in a range of 10000 to 80000.

The PET resin may be used alone or in combination of two or more kinds thereof.

Here, the weight-average molecular weight of the "PET resin" in the present specification is measured by dissolving 0.6 mg of the PET resin in 2 g of HFIP (1,1,1,3,3,3-hexafluoro-2-propanol, FUJIFILM Wako Pure Chemical Corporation) overnight under the following conditions according to gel permeation chromatography (GPC).

Measuring device: HLC-8320GPC (TOSOH CORPORATION)

Eluent: HFIP/0.5 mM sodium trifluoroacetate

Flow rate: 0.2 mL/min

Measurement temperature: 40° C.

Analysis column: TSK-Gel Super AWM-H (TOSOH CORPORATION)

Calibration curve: Shodex STANDARD M-75, polymethyl methacrylate (PMMA) (SHOWA DENKO K.K.)

Other Resins

The resin composition according to the present exemplary embodiment may contain other resins as necessary in a range not damaging the effects of the invention.

In a case where the resin composition contains other resins, the content of other resins is, for example, preferably 10% by mass or less with respect to the total amount of the resins in the resin composition.

As other resins, known thermoplastic resins of the related art are exemplified. Specific examples thereof include a polycarbonate resin; a polyester resin; a polyolefin resin; a polyester carbonate resin; a polyphenylene ether resin; a polyphenylene sulfide resin; a polysulfone resin; a polyether sulfone resin; a polyarylene resin; a polyetherimide resin; a polyacetal resin; a polyvinyl acetal resin; a polyketone resin; a polyether ketone resin; a polyether ether ketone resin; a polyaryl ketone resin; a polyether nitrile resin; a liquid crystal resin; a polybenzimidazole resin; a polyparabanic acid resin; a vinyl-based polymer or a copolymer resin obtained by polymerizing or copolymerizing one or more vinyl monomers selected from the group consisting of an aromatic alkenyl compound, methacrylic acid ester, acrylic acid ester, and a vinyl cyanide compound; a diene-aromatic alkenyl compound copolymer resin; a vinyl cyanide-diene-aromatic alkenyl compound copolymer resin; an aromatic alkenyl compound-diene-vinyl cyanide-N-phenylmaleimide copolymer resin; a vinyl cyanide-(ethylene-diene-propylene (EPDM))-aromatic alkenyl compound copolymer resin; polyolefin; a vinyl chloride resin; and a chlorinated vinyl chloride resin.

These other resins may be used alone or in combination of two or more kinds thereof.

Specific Flame Retardant (C)

The specific flame retardant is a condensed phosphoric acid ester-based flame retardant.

Examples of the condensed phosphoric acid ester-based flame retardant include bisphenol A type aromatic condensed phosphoric acid ester, biphenylene type aromatic condensed phosphoric acid ester, and isophthalic type aromatic condensed phosphoric acid ester.

Specific examples of the aromatic condensed phosphoric acid ester include a compound represented by Formula (I) or Formula (II).

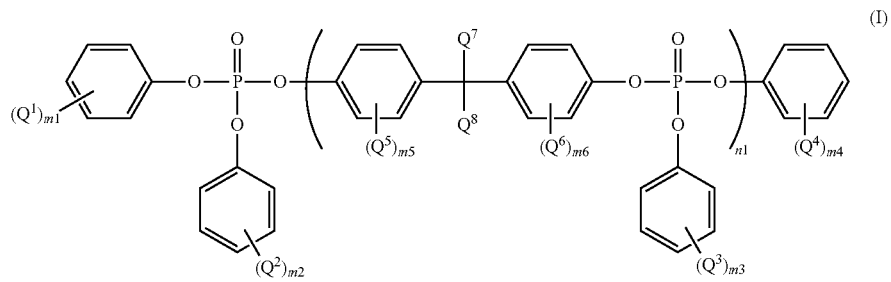

In Formula (I), $Q^2$, $Q^2$, $Q^3$, and $Q^4$ each independently represent an alkyl group having 1 to 6 carbon atoms, $Q^5$ and $Q^6$ each represent a methyl group, $Q^7$ and $Q^8$ each represent a methyl group, m1, m2, m3, and m4 each independently represent an integer of 0 to 3, m5 and m6 each independently represent an integer of 0 to 2, and n1 represents an integer of 0 to 10.

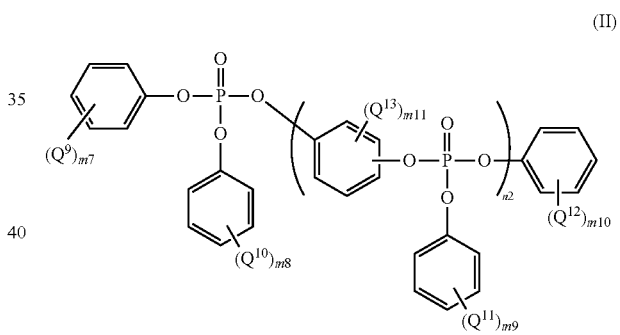

In Formula (II), $Q^9$, $Q^{10}$, $Q^{11}$, and $Q^{12}$ each independently represent an alkyl group having 1 to 6 carbon atoms, $Q^{13}$ represents a methyl group, m7, m8, m9, and m10 each independently represent an integer of 0 to 3, m11 represents an integer of 0 to 4, and n2 represents an integer of 0 to 10.

As the aromatic condensed phosphoric acid ester, a synthetic product or a commercially available product may be used.

Specific examples of the commercially available product of the aromatic condensed phosphoric acid ester include commercially available products (such as "PX-200", "PX-201", "PX-202", and "CR-741", manufactured by DAIHACHI CHEMICAL INDUSTRY CO., LTD.) and commercially available products (such as "ADK STAB FP-600" and "ADK STAB FPR", manufactured by ADEKA CORPORATION).

Among these, for example, it is preferable that at least one selected from a compound (such as "PX-200", manufactured by DAIHACHI CHEMICAL INDUSTRY CO., LTD.) represented by Structural Formula (1) or a compound (such as "CR-741" manufactured by DAIHACHI CHEMICAL INDUSTRY CO., LTD.) represented by Structural Formula (2) is used as the aromatic condensed phosphoric acid ester.

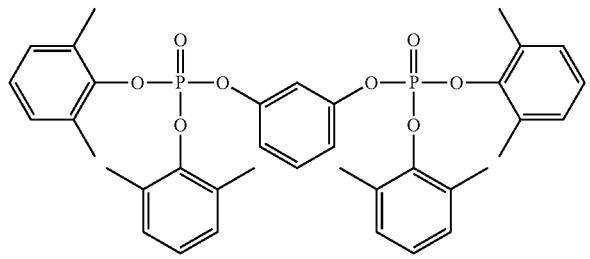

Structured Formula (1)

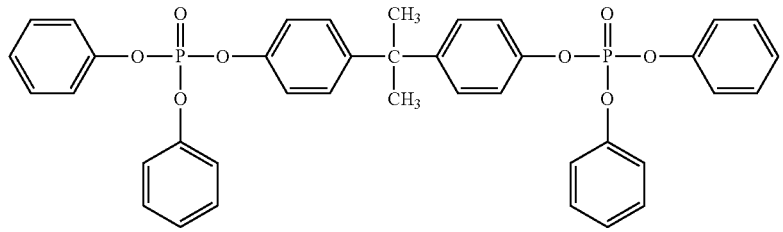

Structured Formula (2)

The specific flame retardant may be used alone or in combination of two or more kinds thereof.

From the viewpoint of improving the flame retardance without degrading the impact resistance, the content of the specific flame retardant is, for example, preferably in a range of 5% by mass to 20% by mass, more preferably in a range of 7% by mass to 15% by mass, and still more preferably in a range of 7% by mass to 13% by mass with respect to the total amount of the ABS resin and the PET resin.

Thermally expandable graphite (D)

The thermally expandable graphite is a granular material that expands at the time of being heated.

More specifically, the thermally expandable graphite is a granular material formed such that an oxidizing agent is contained between layers of hexagonal plate-like crystals in flaky graphite which is a mineral containing carbon as a main component. In a case where the thermally expandable graphite is heated, the oxidizing agent contained between the layers of hexagonal plate-like crystals is decomposed and gasified, and the distance between layers expands due to the pressure caused by the gasification so that the thermally expandable graphite expands.

Examples of the oxidizing agent include an inorganic acid such as concentrated sulfuric acid, nitric acid, or selenic acid, concentrated nitric acid, perchloric acid, perchlorate, permanganate, dichromate, and hydrogen peroxide.

The expansion starting temperature of the thermally expandable graphite is not particularly limited. For example, it is preferable that the expansion starting temperature thereof is higher than the heating temperature (for example, the heating temperature is approximately in a range of 200° C. to 230° C.) at the time of melting and kneading a raw material mixture during the production of the resin composition so that the expansion is not started by the heating at the time of melting and kneading. From the above-described viewpoint, for example, it is preferable that the expansion starting temperature of the thermally expandable graphite is higher than the molding temperature (the cylinder temperature in a case of injection molding) at the time of molding the resin molded body from the resin composition.

Specifically, the expansion starting temperature of the thermally expandable graphite is, for example, preferably 240° C. or higher, more preferably 260° C. or higher, and still more preferably 280° C. or higher.

Here, the expansion starting temperature of the thermally expandable graphite indicates the temperature set by heating the thermally expandable graphite at a rate of 5° per minute from 150° C., reading the volume thereof at every 5° C., and expanding the volume of the thermally expandable graphite to greater than or equal to 1.1 times the original volume.

From the viewpoint of improving the flame retardance of the resin molded body, the degree of expansion of the thermally expandable graphite at 1000° C. is, for example, preferably 180 cc/g or greater and more preferably 200 cc/g or greater.

Here, the degree of expansion of the thermally expandable graphite at 1000° C. indicates the volume (cc) per unit g in a case where the thermally expandable graphite is held at 1000° C. for 10 seconds.

As the thermally expandable graphite, a synthetic product or a commercially available product may be used.

Examples of the commercially available product include "MZ-260" (expansion starting temperature of 260° C., degree of expansion of 215 cc/g) and "MZ-285" (expansion starting temperature of 285° C., degree of expansion of 215 cc/g) (both manufactured by AIR WATER INC.).

The thermally expandable graphite may be used alone or in combination of two or more kinds thereof.

From the viewpoint of improving the flame retardance without degrading the impact resistance, the content of the thermally expandable graphite is, for example, preferably in a range of 0.05% by mass to 5.0% by mass, more preferably in a range of 0.1% by mass to 0.3% by mass, and still more preferably in a range of 0.15% by mass to 0.25% by mass with respect to the total amount of the ABS resin and the PET resin.

From the viewpoint of improving the flame retardance without degrading the impact resistance, the content of the thermally expandable graphite with respect to the condensed phosphoric acid ester-based flame retardant in the resin composition according to the present exemplary embodiment (in other words, mass of thermally expandable graphite/mass of condensed phosphoric acid ester-based flame retardant×100) is, for example, preferably in a range of 5.0% by mass to 30.0% by mass and more preferably in a range of 10.0% by mass to 25.0% by mass.

Other Components

The resin composition according to the present exemplary embodiment may contain components other than the components (A) to (D) described above as necessary.

Examples of other components include an antioxidant, a compatibilizer, a releasing agent, a lightfast agent, a weatherproof agent, a colorant, a pigment, a modifier, a dripping inhibitor, an antistatic agent, a hydrolysis inhibitor, a filler, and a reinforcing agent (such as glass fibers, carbon fibers, talc, clay, mica, glass flakes, milled glass, glass beads, crystalline silica, alumina, silicon nitride, aluminum nitride, or boron nitride).

The content of other components is, for example, preferably in a range of 0% by mass to 5% by mass with respect to the total amount of the resin composition. Here, "0% by mass" indicates that the resin composition does not contain other components.

Method of Producing Resin Composition

The resin composition according to the present exemplary embodiment is produced by, for example, melting and kneading the mixture of the above-described components. In addition, the resin composition according to the present exemplary embodiment is produced by, for example, dissolving the above-described components in a solvent.

Known means may be used as the means for melting and kneading the mixture, and specific examples thereof include a twin screw extruder, a Henschel mixer, a Bunbury mixer, a single screw extruder, a multi-screw extruder, and a co-kneader.

Further, the temperature at the time of melting and kneading the mixture may be set according to the melting points of the ABS resin and the PET resin and is, for example, preferably in a range of 220° C. to 300° C. and more preferably in a range of 250° C. to 290° C. from the viewpoint of suppressing thermal decomposition while melting the resins.

Resin Molded Body

The resin molded body according to the present exemplary embodiment contains the resin composition according to the present exemplary embodiment.

Specifically, the resin molded body according to the present exemplary embodiment is obtained by molding the resin composition according to the present exemplary embodiment.

As described above, the resin molded body obtained by molding the resin composition according to the present exemplary embodiment has high impact resistance and excellent flame retardance.

The charpy impact strength of the resin molded body according to the present exemplary embodiment is, for example, preferably in a range of 10 kJ/m$^2$ to 30 kJ/m$^2$ (more preferably in a range of 15 kJ/m$^2$ to 30 kJ/m$^2$).

Further, the tensile elongation at break of the resin molded body according to the present exemplary embodiment is, for example, preferably 10% or greater (more preferably 13% or greater).

Here, the charpy impact strength and tensile elongation at break are indices showing that the impact resistance is excellent and mean that the resin molded body has excellent impact resistance in a case where the charpy impact strength is 10 kJ/m$^2$ or greater or the tensile elongation at break is 10% or greater.

The methods of measuring the charpy impact strength and the tensile elongation at break will be described in detail in the following examples.

Further, for example, it is preferable that the flame retardance of the resin molded body according to the present exemplary embodiment satisfies the V-2 criteria in the UL 94 standards.

Here, the method of evaluating the flame retardance in the UL 94 standards will be described in detail in the following examples.

As the molding method for obtaining the resin molded body according to the present exemplary embodiment, injection molding, extrusion molding, blow molding, hot press molding, calender molding, coating molding, cast molding, dipping molding, vacuum molding, or transfer molding is employed.

From the viewpoint that the degree of freedom of the shape is high, for example, injection molding is desirable as the molding method for obtaining the resin molded body according to the present exemplary embodiment.

Further, commercially available devices such as NEX150 (manufactured by NISSEI PLASTIC INDUSTRIAL CO., LTD.), NEX70000 (manufactured by NISSEI PLASTIC INDUSTRIAL CO., LTD.), and SE50D (manufactured by TOSHIBA MACHINE CO., LTD.) may be used for injection molding.

The molding temperature (for example, the cylinder temperature in a case of injection molding) at the time of molding the resin molded body is, for example, preferably in a range of 200° C. to 300° C. and more preferably in a range of 220° C. to 280° C.

Further, the die temperature in a case of injection molding is, for example, in a range of 40° C. to 60° C. and more desirably in a range of 45° C. to 55° C.

The resin molded body according to the present exemplary embodiment may be used for applications such as electric and electronic equipment, office equipment, house appliances, automotive interior materials, and containers. More specifically, the resin molded body is used for housings of electric and electronic equipment and house appliances; various components of electric and electronic equipment and house appliances; interior components of automobiles; storage cases of CD-ROM and DVD; tableware; bottles for beverage; food trays; wrapping materials; films; and sheets.

Particularly, since many components of electric and electronic equipment have complicated shapes and are heavy, the electric and electronic equipment is required to have mechanical strength, and these required characteristics are sufficiently satisfied in a case where the resin molded body according to the present exemplary embodiment is used.

EXAMPLES

Hereinafter, the present invention will be described in detail with reference to the following examples, but the present invention is not limited to these examples. Further, "parts" and "%" in the description below are on a mass basis unless otherwise specified.

Preparation of Raw Materials of Resin Composition

Each component described below is prepared.

Resin

ABS Resin (A)

ABS resin (A-1): "PA716", manufactured by Chimei Corporation, weight-average molecular weight of 10000

ABS resin (A-2): "PA709", manufactured by Chimei Corporation, weight-average molecular weight of 25000

PET Resin (B)

Virgin PET resin (B-1): "J125", manufactured by Mitsui Chemicals, Inc., amount of terminal carboxy group of 7 eq/t Recovered PET resin (B-2): "recovered PET resin derived from PET fiber", amount of terminal carboxy group of 10 eq/t Recovered PET resin (B-3): "NA-BT7906", manufactured by Kyoei Sangyo Co., Ltd., amount of terminal carboxy group of 15 eq/t Recovered PET resin (B-4): "recovered PET resin derived from PET film", amount of terminal carboxy group of 18 eq/t Specific Flame Retardant (C)

Specific flame retardant (C-1): aromatic condensed phosphoric acid ester, "CR-741", manufactured by DAIHACHI CHEMICAL INDUSTRY CO., LTD., phosphorous content of 8.8%

Specific flame retardant (C-2): aromatic condensed phosphoric acid ester, "PX-200", manufactured by DAIHACHI CHEMICAL INDUSTRY CO., LTD., phosphorous content of 9.0%

Thermally Expandable Graphite (D)

Specific flame retardant (D-1): "MZ-260", manufactured by AIR WATER INC., expansion starting temperature of 260° C.

Specific flame retardant (D-2): "MZ-285", manufactured by AIR WATER INC., expansion starting temperature of 285° C.

Other Components

Antioxidant: phenol-based antioxidant, "Irganox 1076", manufactured by BASF SE

Examples 1 to 10 and Comparative Examples 1 to 3

Preparation of Resin Composition

Respective components listed in Table 1 are uniformly mixed using a tumbler with the composition listed in Table 1, and the mixture is melted and kneaded using a twin screw extruder with a vent (manufactured by The Japan Steel Works, LTD.; TEX-30α) under conditions of a cylinder temperature and a die temperature of 260° C., a screw rotation speed of 200 rpm, a vent suction degree of 100 MPa, and a discharge amount of 20 Kg/h, thereby obtaining a resin composition (pellet).

Preparation of Resin Molded Body (Test Piece)

Next, the obtained pellets are dried using a hot air drier at 80° C. for 4 hours and molded using an injection molding machine (trade name "NEX500", manufactured by TOSHIBA MACHINE CO., LTD.), thereby obtaining resin molded bodies (various test pieces for evaluation which have shapes and sizes according to the evaluation described below).

At the time of injection molding, the cylinder temperature is set to 260° C. and the die temperature is set to 60° C.

Evaluation

The following tests are performed on the obtained various resin molded bodies (test pieces for evaluation) for evaluation. The results are listed in Table 1.

Flame Retardance Test

A V-2 test of the UL 94 standard is performed using test pieces (having a thickness of 1.5 mm).

The evaluation standard for the flame retardance is as follows.

V-2: test pieces which satisfy the V-2 criteria

Not-V: test pieces which do not satisfy the V-2 criteria and have more degraded flame retardance than V-2

Heat Resistance Test

In a state in which a load (1.8 MPa) determined by the test method standard of ASTM D648 is applied to a test piece for ASTM D648, the temperature of the test piece is increased, and the temperature (load deflection temperature: DTUL) at which the size of deflection reaches a specified value is measured.

Mechanical Characteristic Test

Impact Resistance

The charpy impact strength (kJ/m$^2$) of an ISO multi-purpose dumbbell test piece which has been subjected to notch processing is measured using an impact resistance test device (DG-5, manufactured by TOYO SEIKI Co., Ltd.) according to the method specified in ISO 179.

Tensile strength at break and tensile elongation at break

The tensile strength at break (MPa) and the tensile elongation at break (%) of a JIS No. 1 test piece (having a thickness of 4 mm) are measured in conformity with JIS K 7113.

Surface Impact Strength

A test piece in which a square hole having a size of 10 mm×10 mm is cut-processed from a central portion of a flat plate test piece having a length of 60 mm, a width of 60 mm, and a thickness of 2 mm is prepared.

A steel ball having a diameter of 50 mm and a weight of 500 g is allowed to fall down and collide with the central portion of the obtained test piece from a height of 0.7 m to 2 m, and the surface impact strength is evaluated as follows.

This surface impact strength test is performed three times at each height. Further, it is desired for practical use that the surface impact strength tested by allowing a steel ball to fall down at a falling height of 1.3 m is evaluated as A.

A: No cracks are found in the periphery of the square hole of the test piece.

B: One to three cracks are generated in the periphery of the square hole of the test piece.

C: The test piece is broken into a plurality of pieces.

Louver portion (opening portion) strength test

A steel ball having a diameter of 50 mm and a weight of 500 g is allowed to fall down and collide with the central portion of a test piece 1 (having a thickness of 2 mm) including a lattice-like louver portion (opening portion) 10 illustrated in the FIGURE at a height of 1.3 m, and the louver portion (opening portion) strength is evaluated under the following conditions.

This louver portion (opening portion) strength test is performed three times. Further, it is desired for practical use that the strength tested by allowing a steel ball to fall down at a falling height of 1.3 m is evaluated as A.

A: No cracks are found in the test piece or only small cracks with a size of 1 mm or less in the thickness direction are found.

B: One or two cracks are generated in the periphery of the louver portion.

C: Three or more cracks are generated in the periphery of the louver portion.

TABLE 1

|  |  | Example 1 | Example 2 | Example 3 | Example 4 | Example 5 | Example 6 | Example 7 |
|---|---|---|---|---|---|---|---|---|
| Composition (part by mass) | ABS resin (A-1) | 70 |  | 70 |  |  |  |  |
|  | ABS resin (A-2) |  | 70 |  | 70 | 70 | 70 | 70 |
|  | Virgin PET resin (B-1) | 30 | 30 | 30 | 30 |  |  |  |
|  | Recovered PET resin (B-2) |  |  |  |  | 30 |  |  |
|  | Recovered PET resin (B-3) |  |  |  |  |  | 30 |  |
|  | Recovered PET resin (B-4) |  |  |  |  |  |  | 30 |
|  | Specific flame retardant (C-1) | 10 | 10 | 10 | 10 | 10 | 10 | 10 |
|  | Specific flame retardant (C-2) |  |  |  |  |  |  |  |
|  | Thermally expandable graphite (D-1) | 2.0 | 2.0 |  |  |  |  |  |
|  | Thermally expandable graphite (D-2) |  |  | 2.0 | 2.0 | 2.0 | 2.0 | 2.0 |
|  | Antioxidant | 0.2 | 0.2 | 0.2 | 0.2 | 0.2 | 0.2 | 0.2 |
| Flame retardance | UL 94 standards | V-2 | V-2 | V-2 | V-2 | V-2 | V-2 | V-2 |
| Heat resistance | DTUL (1.8 MPa) | 66 | 67 | 65 | 66 | 64 | 66 | 64 |
| Mechanical characteristics | Tensile strength at break (MPa) | 52 | 53 | 54 | 56 | 52 | 55 | 52 |
|  | Tensile elongation at break (%) | 16 | 14 | 18 | 20 | 13 | 17 | 14 |
|  | Charpy impact strength (kJ/m$^2$) | 16 | 20 | 18 | 22 | 13 | 20 | 14 |
| Surface impact strength | Falling height of 0.7 m | AAA | AAA | AAA | AAA | AAA | AAA | AAA |
|  | Falling height of 1.0 m | AAA | AAA | AAA | AAA | AAA | AAA | AAA |
|  | Falling height of 1.3 m | AAA | AAA | AAA | AAA | AAA | AAA | AAA |
|  | Falling height of 1.6 m | ABB | AAA | AAA | AAA | AAA | AAA | AAA |
|  | Falling height of 2.0 m | BBB | ABB | AAB | AAA | ABB | AAA | ABB |
| Louver portion strength | Falling height of 1.3 m | AAA | AAA | AAA | AAA | AAA | AAA | AAA |

|  |  | Example 8 | Example 9 | Example 10 | Comparative Example 1 | Comparative Example 2 | Comparative Example 3 |
|---|---|---|---|---|---|---|---|
| Composition (part by mass) | ABS resin (A-1) |  |  |  | 70 |  |  |
|  | ABS resin (A-2) | 70 | 70 | 70 |  | 70 | 70 |
|  | Virgin PET resin (B-1) | 30 | 30 | 30 | 30 | 30 | 30 |
|  | Recovered PET resin (B-2) |  |  |  |  |  |  |
|  | Recovered PET resin (B-3) |  |  |  |  |  |  |
|  | Recovered PET resin (B-4) |  |  |  |  |  |  |
|  | Specific flame retardant (C-1) |  | 15 | 10 | 10 | 10 |  |
|  | Specific flame retardant (C-2) | 10 |  |  |  |  |  |
|  | Thermally expandable graphite (D-1) |  |  |  |  |  |  |
|  | Thermally expandable graphite (D-2) | 2.0 | 2.0 | 3.0 |  |  | 5.0 |
|  | Antioxidant | 0.2 | 0.2 | 0.2 | 0.2 | 0.2 | 0.2 |
| Flame retardance | UL 94 standards | V-2 | V-2 | V-2 | not-V | not-V | not-V |
| Heat resistance | DTUL (1.8 MPa) | 67 | 61 | 67 | 62 | 63 | 67 |
| Mechanical characteristics | Tensile strength at break (MPa) | 51 | 50 | 52 | 48 | 49 | 50 |
|  | Tensile elongation at break (%) | 12 | 35 | 11 | 3 | 2 | 2 |
|  | Charpy impact strength (kJ/m$^2$) | 20 | 12 | 14 | 3 | 4 | 9 |
| Surface impact strength | Falling height of 0.7 m | AAA | AAA | AAA | AAA | AAA | AAA |
|  | Falling height of 1.0 m | AAA | AAA | AAA | AAB | AAA | AAA |
|  | Falling height of 1.3 m | AAA | AAA | AAA | BCC | AAB | BBB |
|  | Falling height of 1.6 m | AAA | ABB | AAB | CCC | ABB | BCC |
|  | Falling height of 2.0 m | AAB | BBB | BBB | CCC | CCC | CCC |
| Louver portion strength | Falling height of 1.3 m | AAA | AAA | AAA | CCC | BBC | CCC |

Based on the results described above, it is found that excellent results are obtained from the evaluations of the flame retardance and the mechanical characteristics (particularly, the charpy impact strength and the tensile elongation at break) in the present examples, compared to the comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A resin composition comprising:
an acrylonitrile-butadiene-styrene resin (A);
a polyethylene terephthalate resin (B);
a condensed phosphoric acid ester-based flame retardant (C); and
a thermally expandable graphite (D), wherein a content of the acrylonitrile-butadiene-styrene resin (A) is in a range of 60% by mass to 90% by mass with respect to the total amount of the acrylonitrile-butadiene-styrene resin (A) and the polyethylene terephthalate resin (B), wherein a content of the thermally expandable graphite (D) is in a range of 1.0% by mass to 3.0% by mass with respect to the total amount of the acrylonitrile-butadiene-styrene resin (A) and the polyethylene terephthalate resin (B), wherein a content of the condensed phosphoric acid ester-based flame retardant (C) is in a range of 7% by mass to 15% by mass with respect to the total amount of the acrylonitrile-butadiene-styrene resin (A) and the polyethylene terephthalate resin (B).

2. The resin composition according to claim 1, wherein a weight-average molecular weight of the acrylonitrile-butadiene-styrene resin (A) is in a range of 5000 to 50000.

3. The resin composition according to claim 1, wherein an expansion starting temperature of the thermally expandable graphite (D) is 240° C. or higher.

4. The resin composition according to claim 1, wherein the polyethylene terephthalate resin (B) is a recovered resin.

5. A resin molded body comprising:
the resin composition according to claim 1.

6. The resin molded body according to claim 5, that has a charpy impact strength in a range of 10 kJ/m$^2$ to 30 kJ/m$^2$.

7. The resin molded body according to claim 5, that has a tensile elongation at break of 10% or greater.

8. The resin molded body according to claim 5, that has flame retardance satisfying V-2 criteria in UL 94 standards.

9. A resin composition comprising:
an acrylonitrile-butadiene-styrene resin (A);
a polyethylene terephthalate resin (B);
a condensed phosphoric acid ester-based flame retardant (C); and
a thermally expandable graphite (D), wherein a content of the acrylonitrile-butadiene-styrene resin (A) is in a range of 60% by mass to 90% by mass with respect to the total amount of the acrylonitrile-butadiene-styrene resin (A) and the polyethylene terephthalate resin (B), wherein a content of the thermally expandable graphite (D) is in a range of 1.0% by mass to 3.0% by mass with respect to the total amount of the acrylonitrile-butadiene-styrene resin (A) and the polyethylene terephthalate resin (B), wherein a content of the condensed phosphoric acid ester-based flame retardant (C) is in a range of 7% by mass to 15% by mass with respect to the total amount of the acrylonitrile-butadiene-styrene resin (A) and the polyethylene terephthalate resin (B), wherein a content of the thermally expandable graphite (D) is in a range of 10.0% by mass to 25.0% by mass with respect to the condensed phosphoric acid ester-based flame retardant (C).

* * * * *